UNITED STATES PATENT OFFICE.

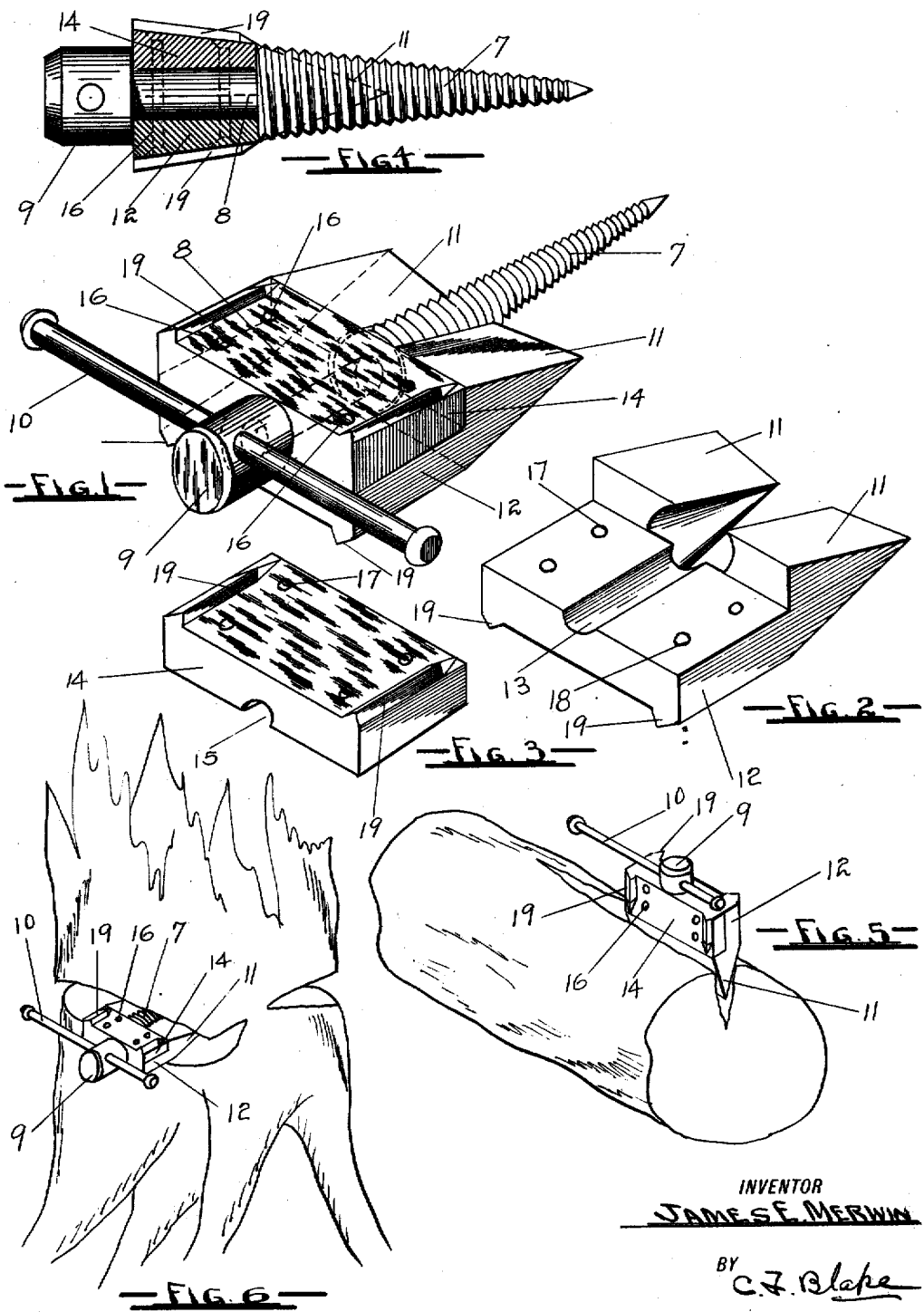

JAMES E. MERWIN, OF PORTLAND, OREGON, ASSIGNOR OF ONE-THIRD TO ROBERT KASH, OF PORTLAND, OREGON, AND ONE-THIRD TO AUTOMATIC MANUFACTURING COMPANY, OF PORTLAND, OREGON, A CORPORATION.

WEDGE.

1,319,656.     Specification of Letters Patent.     Patented Oct. 21, 1919.

Application filed July 25, 1918. Serial No. 246,774.

*To all whom it may concern:*

Be it known that I, JAMES E. MERWIN, a citizen of the United States, residing at Portland, county of Multnomah, State of Oregon, have invented certain new and useful Improvements in Wedges, of which the following is a specification.

My invention relates to wedges in general, and particularly to wedges used to split timbers and the like, the object of my invention being to provide a wedge that may be manually operated to draw itself into the timber to be split.

I accomplish the above object by means of the construction illustrated in the accompanying drawing, which is a part of this application for Letters Patent, like characters of reference indicating like parts throughout the several views thereof, and in which:

Figure 1 is a perspective view of my device.

Fig. 2 is a perspective view of the wedge.

Fig. 3 is a perspective view of the cap.

Fig. 4 is an elevation of the screw, the wedge and cap being sectioned.

Fig. 5 illustrates the use of my device in splitting a log.

Fig. 6 illustrates the use of my device in felling a tree.

In general my device consists of a screw and a handle with which to insert the screw into the timber, and a wedge adapted to be drawn into the timber by the screw.

In order that the screw 7 may have a splitting effect upon the timber I give it a conical shape, as shown in Figs. 1 and 4.

To provide means for mounting the wedge I form a spindle or shank 8 upon the large end of the screw 7 and axial therewith.

To operate the screw 7 I provide a head 9 upon the shank 8, and therethrough I pass a bar 10 to serve as a handle with which to rotate the screw.

Upon shank 8 I mount a wedge member consisting of a bifurcated wedge having two prongs 11 adapted to receive the screw 8 therebetween, as shown in Fig. 1, and a tail 12 adapted to receive the shank 8 in a recess 13 in said tail.

A cap 14 is provided, having therein a recess 15 to receive the shank 8, said cap being secured to tail 12 of the wedge member by rivets 16 in orifices 17 and 18 of the cap and tail respectively, thereby making the wedge member a rotatable prisoner upon the shank 8.

To secure the wedge from sidewise movement I provide fins 19 upon the tail 12 and the cap 14.

In use the handle 10 is drawn through the head 9 until it extends entirely upon one side thereof, and then the screw is driven into the timber by a blow similar to that used with an axe, and when so set into the timber the screw is rotated by the handle, thus drawing the screw and the wedge into the timber to split the same, as shown in Fig. 5.

My device is especially useful in felling trees, as shown in Fig. 6, because the screw 7 prevents the forcible ejection of the wedge such as frequently occurs with disastrous results to the safety of the operators with the forms of wedge now in use.

My device may be made of any size and constructed of any materials deemed convenient and suitable for a device of this character, and while I have illustrated and described a form of construction and arrangement of parts found desirable in materializing my invention, I wish to include in this application for Letters Patent all mechanical equivalents and substitutes that may fairly be considered to come within the scope and purview of my invention as defined in the appended claims.

Having disclosed my invention so that others skilled in the art may be enabled to construct and to use the same, what I wish to secure by Letters Patent, claiming as new, is:

1. A conical screw; an axial shank thereon; a head upon said shank; said head and screw forming shoulders upon their respective ends of said shank; a handle freely mounted transversely in said head; and a bifurcated wedge rotatably mounted upon said shank and longitudinally held prisoner between said shoulders, the prongs thereof receiving said screw therebetween and extending axially thereof, for a portion of the length of said screw.

2. In a wedge, a two piece head having semi-circular channels in each piece, and means to secure said two pieces together so that said semi-circular channels will coöperate to form a circular orifice through said head; wedge shaped prongs integral with one of said head pieces and extending therefrom upon each side of said orifice and parallel therewith; a conical screw intermediate said prongs and extending beyond the same; a shank upon said screw rotatably mounted in said orifice and longitudinally secured therein by shoulders upon each end of said shank; a perforated head upon said shank; and a handle mounted in the perforation of said head, adapted to rotate said screw or to be used as a hammer handle when initially inserting said screw into the work.

3. A bifurcated wedge rotatably mounted and longitudinally fixed upon a centrally and axially disposed conical screw extending beyond said wedge; a head upon said screw; and a handle mounted upon said head and adapted to be used in forcibly driving said screw into a log or the like and subsequently rotating said screw for the purpose of drawing said wedge into said log to split the same.

In witness whereof I claim the foregoing to be my own I hereunto affix my signature in the presence of two subscribing witnesses, at Portland, county of Multnomah, State of Oregon, this 3rd day of July, 1918.

JAMES E. MERWIN.

Witnesses:
C. F. BLAKE,
E. A. HERTSCHE.

Copies of this patent may be obtained for five cents each, by addressing the "Commissioner of Patents, Washington, D. C."